May 18, 1965  A. HÜLLER  3,183,783
ARRANGEMENT FOR MOVING COMPONENTS OF MACHINE TOOLS AND THE LIKE
Filed July 5, 1962

Inventor:
Adolf Hüller
by:
Michael J. Striker
Atty

United States Patent Office 3,183,783
Patented May 18, 1965

3,183,783
ARRANGEMENT FOR MOVING COMPONENTS OF MACHINE TOOLS AND THE LIKE
Adolf Hüller, Ludwigsburg, Germany, assignor to Karl Hüller G.m.b.H., Württemberg, Germany
Filed July 5, 1962, Ser. No. 207,752
Claims priority, application Germany, July 6, 1961, H 43,053
7 Claims. (Cl. 90—58)

The present invention relates to machine tools in general, and more particularly to an arrangement which is especially suited for moving and guiding work- or tool-supporting components of machine tools and the like. Still more particularly, the invention relates to an arrangement which is adapted to reciprocate a knee, a saddle, a table and/or a similar reciprocable slide in a milling machine or another machine tool.

It is known to construct a milling machine in such a way that a workpiece may move in three different directions so as to make sure that the workpiece may assume any desired position with respect to the tool spindle. In conventional vertical milling machines of the knee-type, the knee is reciprocable up and down along the column, the saddle is reciprocable with respect to the knee in a first horizontal plane, and the work supporting table is reciprocable or turnable with respect to the saddle in a second horizontal plane. In such milling machines, the means for reciprocating the knee along the column usually comprises a spindle which is fixed to the base of the machine and which cooperates with a spindle nut or the like to advance the knee toward or away from the tool.

A serious drawback of such machines is that the spindle cannot provide adequate guidance for the knee and for all such components which are mounted on the knee. Consequently, the knee is likely to become tilted particularly if it is subjected to stresses at points which are spaced from its center of gravity because such stresses tend to bend the spindle. On the other hand, it is highly desirable to insure that the work is properly aligned with the tool spindle, particularly when the machine is used for precision treatment of metallic and other workpieces. The disadvantages of a milling machine wherein the knee is mounted on and is reciprocable by a spindle are particularly evident when the tool spindle is arrested, i.e., when the cutting action of the milling tool is terminated. As soon as the tool ceases to cut into the material of the workpiece, the machine tends to vibrate and such vibration causes rattling and resultant inaccuracies in guidance of workpieces.

Accordingly, it is an important object of the present invention to provide a supporting, guiding and reciprocating arrangement for knees, saddles, tables and other types of slides in milling machines and other machine tools, this arrangement being constructed and assembled in such a way that it reduces the likelihood of or eliminates rattling and that it maintains the workpiece in precise alignment with the tool, or vice versa.

Another object of the invention is to provide an arrangement of the just outlined characteristics which is especially suited for supporting and for imparting movements to a component which is reciprocable in directions parallel with the axis of the tool spindle in a milling machine or another machine tool.

A further object of the invention is to provide an arrangement of the above outlined characteristics which is adapted to impart reciprocatory movements to a vertically movable knee or another work supporting slide in a milling machine or another machine tool.

An additional object of the invention is to provide an arrangement for reciprocating a selected slide in a machine tool or the like which is of very compact design, which occupies space that is normally available in many types of machine tools, and which is adapted to cooperate with a reciprocable component in such a manner that the remaining reciprocable component or components may be mounted in the customary way without any interference on the part of the novel arrangement.

A concomitant object of the invention is to provide an arrangement of the just outlined characteristics which enables a selected slide to find support on two stationary supporting means of a machine tool or the like.

Still another object of the invention is to provide an arrangement of the above outlined characteristics which is capable of preventing any rattling of slidable components irrespective of whether such components are subjected to eccentric or symmetrically distributed stresses.

With the above objects in view, the invention resides in the provision of a machine tool comprising first supporting means which may assume the form of a column and which is provided with first elongated guide means, second supporting means which may assume the form of a base projecting beyond and having second elongated guide means extending in a direction away from and making an angle of less than 180 degrees (e.g., about 105 degrees) with the plane of the first guide means, a slide which may assume the form of a knee for a vertical milling machine and which is reciprocably mounted in the first guide means, this slide having a side which preferably makes an acute angle (e.g., about 60 degrees) with the plane of the first guide means, and an arrangement for reciprocating the slide along the first guide means. This arrangement comprises a motion transmitting member which is reciprocably mounted in the second guide means so as to be movable toward and away from the first guide means. The motion transmitting member has a side which slidably engages the side of the slide, and the improved arrangement further comprises means for reciprocating the motion transmitting member along the second guide means so that, when the motion transmitting member moves in a first direction along the first guide means the slide is moved in a direction away from the second supporting means whereas, when the motion transmitting member moves in the opposite direction, the slide is free to move in a direction toward the second supporting means.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

Figure 2:
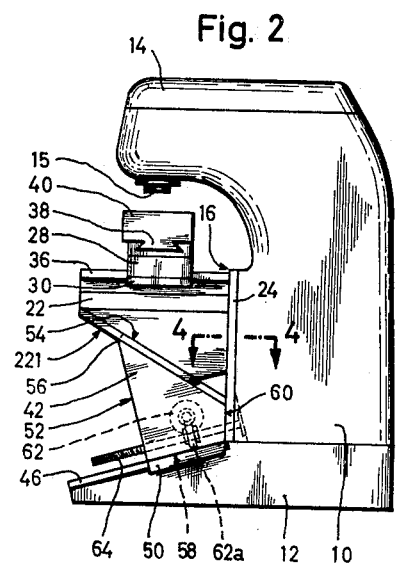
FIG. 2 is a similar side elevational view of the milling machine, showing the knee in its upper end position.
Figure 3:
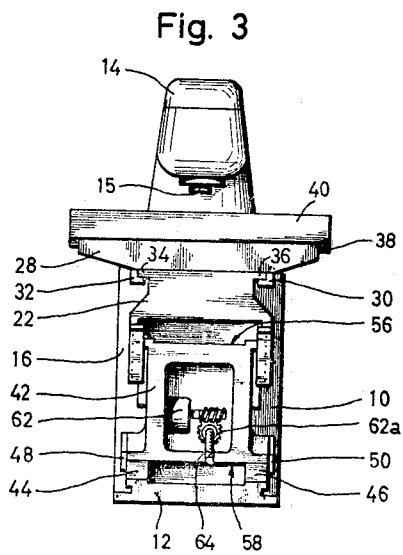
Figure 4:
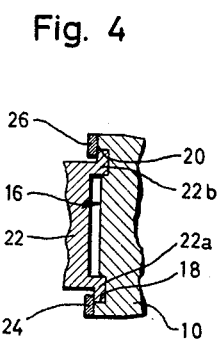

FIG. 3 is a front elevational view of the milling machine wherein the knee assumes the position of FIG. 2; and FIG. 4 is an enlarged fragmentary horizontal section through a portion of the knee to show the manner in which this knee is mounted in vertical guide means provided on the front face of a column which constitutes a stationary supporting means of the milling machine, the section of FIG. 4 being taken in the direction of arrows as seen from the line 4—4 of FIG. 2.

Figure 1:
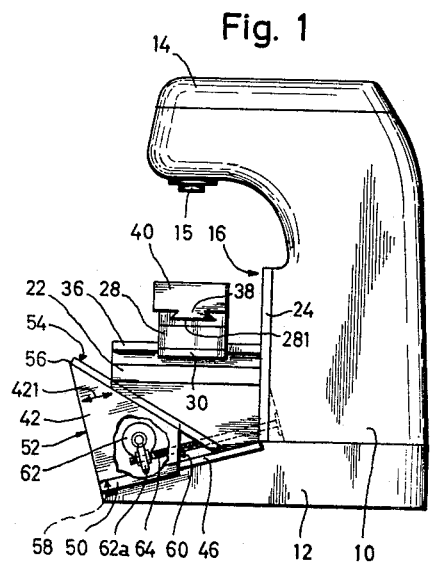
FIG. 1 is a side elevational view of a vertical knee-type milling machine whose knee is reciprocable by an arrangement which embodies my invention, the knee being shown in its lower end position.

Referring now in greater detail to the illustrated embodiment, and first to FIGS. 1 and 2, there is shown a machine tool which assumes the form of a vertical knee-type milling machine. This machine comprises a first stationary supporting means or base 12 for an upright second supporting means or column 10 having a vertical front face 16 and a head 14 which overhangs the front face and which carries the nose 15 of a vertical spindle. The front face 16 is provided with spaced elongated vertical guide means or ways 18, 20 (see FIG. 4) for a vertically reciprocable slide or knee 22, the latter having vertical rails 22a, 22b which are respectively retained in guide means 18, 20 by elongated strips 24, 26. It will be noted that the base 12 extends forwardly and beyond the front face 16 of the column 10.

The upper side of the knee 22 is provided with spaced horizontal guides 34, 36 for a pair of L-shaped rails 30, 32 which extend downwardly from a horizontally reciprocable second slide or saddle 28, and the upper side of this saddle is formed with a horizontal groove 281 for a dovetailed rail 38 forming part of and located at the underside of a horizontally reciprocable third slide or table 40. The table 40 constitutes a work supporting means and is movable horizontally from the left to the right or vice versa, as viewed in FIG. 3; the saddle 28 is movable horizontally from the left to the right or vice versa, as viewed in FIG. 1 or 2; and the knee 22 is movable vertically up and down along the front face 16 of the column 10 to give three feeding motions to a workpiece supported by the table 40 and to enable the workpiece to assume any desired position with respect to the spindle nose 15.

In accordance with my invention, the arrangement for moving the knee 22 along the guide means 18, 20 comprises a specially constructed wedge-like motion-transmitting member 42 whose underside 58 is slidable along forwardly and downwardly inclined guide means 44, 46 provided on the upper side of the base 12, these guide means 44, 46 making obtuse angles with the guide means 18, 20 on the front face 16 of the column 10. In other words, the guide means 44, 46 extend in a direction forwardly and away from the front face 16. The member 42 is provided with guide strips 48, 50 which are disposed in vertical planes and which cooperate with guide means 44, 46 to lead the member 42 along the inclined upper side of the base 12. This member 42 assumes the form of an irregular quadrangular prism having a rearwardly and downwardly inclined front side 52, a rearwardly and downwardly inclined upper side 54, a substantially vertical rear side 60, and an upwardly and forwardly inclined underside 58. The sides 52, 54 make an acute angle with each other and meet along a horizontal edge 56, and the side 60 makes obtuse angles with the sides 54 and 58. The upper side 54 abuts against the similarly inclined underside 221 of the knee 22, and it will be noted that the sides 54, 221 make an acute angle with the plane of the guide means 18, 20. The length of the side 52 approximates the length of the side 54, as viewed in FIG. 1 or 2, and the edge 56 is located in front of the knee 22 when the latter assumes its lowermost position which is shown in FIG. 1 and in which the knee is adjacent to the base 12. However, when the member 42 is moved to the position of FIG. 2 or 3 to lift the knee 22 toward the head 14, i.e., away from the base 12, the edge 56 is adjacent to the underside 221. The rear side 60 then abuts against or is near to the front face 16 of the column 10. The side 52 is located in a plane which is substantially perpendicular to the plane of the underside 58. The inclination of the guide means 44, 46 and of the underside 58 with respect to a horizontal plane is about 15 degrees.

The member 42 is reciprocable in directions indicated by the double-headed arrow 421 and thereby performs a twin cam action, namely, its underside 58 slides along the guide means 44, 46 while advancing toward or away from the column 10, and its upper side 54 cooperates with the underside 221 of the knee 22 to lift the latter toward the head 14 or to permit the knee to descent toward the base 12.

The means for reciprocating the motion transmitting member 42 along the guide means 44, 46 comprises a reversible motor 62 which is preferably accommodated in the interior of this member, a spindle nut 62a which is driven by the motor 62 and which is mounted in the member 42, and a spindle 64 which meshes with the nut 62a and one end of which is anchored in the column 10. Of course, it is equally possible to mount the motor 62 and the nut 62a in the column 10 and to anchor one end of the spindle 64 in the member 42.

An important advantage of the inclined guide means 44, 46 is that minimal longitudinal displacements of the motion transmitting member 42 bring about much greater displacements of the knee 22 along the guide means 18, 20. Of course, it is equally within the scope of my invention to mount the guide means 44, 46 in a horizontal plane so that the angle which the upper side 54 of the member 42 makes with the common plane of the ways 18, 20 is the sole factor which determines the extent of vertical displacement of the knee 22 in response to displacement of the member 42 along the base 12. The table 40 and the saddle 28 share all movements of the knee 22.

It will be readily understood that the member 42 constitutes a highly advantageous substitute for spindles which are utilized in conventional milling machines to serve as a means for moving the knee along the column. Thus, the member 42 prevents bending of the base 12 because it cooperates with the knee 22 to provide a strong bridge or bracket between the front face 16 of the column 10 and the upper side of the base 12.

In the illustrated embodiment, the angle between the plane of the guide means 18, 20 and the plane of the upper side 54 of the member 42 is about 60 degrees, and angle between the plane of the guide means 18, 20 and the plane of the underside 58 is about 105 degrees. It has been found that such inclination of the slidable sides 54, 58 on the motion transmitting member 42 enables the latter to reciprocate the knee 22 in response to comparatively small forces so that the power source 62 may consist of a small electric motor with low energy requirements.

Of course, the motor 62 may be replaced by a hydraulic or pneumatic power source without in any way affecting the operation of the improved arrangement.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a machine tool, in combination, first supporting means having first elongated guide means; second supporting means projecting beyond said first supporting means and comprising second elongated guide means extending in a direction away from and making an angle of less than 180 degrees with said first guide means; a slide mounted in and reciprocable along said first guide means, said slide having a side facing said second guide means; and an arrangement for reciprocating said slide along said first guide means, said arrangement comprising a motion transmitting member mounted in and reciprocable along said second guide means in directions toward and away from said first guide means, said member having a side slidably engaging the side of said slide, and means for reciprocating said member along said second guide means, an externally threaded spindle extending into said motion transmitting member and having an end anchored in said first supporting means, and a motor-driven spindle nut mounted in said motion transmitting member and meshing with said spindle.

2. In a machine tool, in combination, a base having an upper side and elongated guide means provided at said upper side; an upright column connected with said base and having a vertical face adjacent to and extending upwardly from said upper side, said face provided with elongated vertical guide means; a slide mounted in and reciprocable along said vertical guide means, said slide having an underside facing the upper side of said base; and an arrangement for reciprocating said slide along said vertical guide means, said arrangement comprising a motion transmitting member mounted in and reciprocable along said elongated guide means on said upper side of said base, in directions toward and away from said vertical face, said member having an upper side slidably engaging the underside of said slide, and means for reciprocating said member along said elongated guide means, at least one of said sides making with said vertical guide means an angle other than 90 degrees but less than 108 degrees so that, when said member is moved in one direction the slide is moved upwardly along said vertical guide means whereas, when said member is moved in the opposite direction the slide is free to descend along said vertical guide means.

3. A combination as set forth in claim 2, wherein said column comprises a head which overhangs and which is spaced from the upper side of said base, and further comprising a vertical spindle mounted in said head.

4. A combination as set forth in claim 2, wherein the upper side of said base makes an obtuse angle with said vertical guide means, and wherein said vertical guide means makes an acute angle with the upper side of said motion transmitting member.

5. A combination as set forth in claim 2, wherein said slide is the knee of a vertical milling machine.

6. A combination as set forth in claim 2, wherein said slide has an upper side provided with horizontal guide means, and further comprising a second slide mounted in and reciprocable along said horizontal guide means.

7. A combination as set forth in claim 5, wherein said second slide has an upper side provided with second horizontal guide means making right angles with said first mentioned horizontal guide means, and further comprising a third slide mounted in and reciprocable along said second horizontal guide means.

References Cited by the Examiner
UNITED STATES PATENTS

| | | | |
|---|---|---|---|
| 614,967 | 11/98 | Mills. | |
| 638,835 | 12/99 | Coran | 269—234 |
| 1,006,974 | 10/11 | Moore et al. | 269—234 X |
| 1,045,984 | 12/12 | King | 269—234 X |
| 2,893,275 | 7/59 | Lindermann | 269—234 X |

FOREIGN PATENTS 98,390  7/61  Norway.

WILLIAM W. DWYER, Jr., *Primary Examiner.*

LEON PEAR, *Examiner.*